(12) United States Patent
Lichtblau

(10) Patent No.: US 7,449,068 B2
(45) Date of Patent: *Nov. 11, 2008

(54) FLAME SPRAYING PROCESS AND APPARATUS

(75) Inventor: George Jay Lichtblau, Ridgefield, CT (US)

(73) Assignee: GJL Patents, LLC, New Canaan, CT (US)

( * ) Notice: Subject to any disclaimer, the term of this patent is extended or adjusted under 35 U.S.C. 154(b) by 236 days.

This patent is subject to a terminal disclaimer.

(21) Appl. No.: 10/948,420

(22) Filed: Sep. 23, 2004

(65) Prior Publication Data

US 2006/0062928 A1    Mar. 23, 2006

(51) Int. Cl.
*B05B 7/16* (2006.01)
*B05C 19/00* (2006.01)
*B05C 5/04* (2006.01)

(52) U.S. Cl. .......................... 118/302; 118/308; 239/81

(58) Field of Classification Search ................. 118/300, 118/302, 308, 309, DIG. 7; 239/79–82, 85, 239/132.1; 404/12, 111, 94, 79, 75; 427/422, 427/426; 264/30, 31
See application file for complete search history.

(56) References Cited

U.S. PATENT DOCUMENTS

| | | | | |
|---|---|---|---|---|
| 2,832,640 A | * | 4/1958 | Shepard ........................ 239/84 |
| 2,960,594 A | * | 11/1960 | Thorpe ......................... 219/75 |
| 3,706,684 A | | 12/1972 | Lopez .................... 260/18 EP |
| 3,719,630 A | | 3/1973 | Antonen ...................... 524/780 |
| 3,800,893 A | | 4/1974 | Ramsay et al. ................. 177/25 |
| 3,953,193 A | | 4/1976 | Bessen ....................... 75/0.5 R |
| 4,034,126 A | * | 7/1977 | Funakoshi et al. .............. 427/8 |
| 4,128,065 A | | 12/1978 | Kelly et al. .................. 110/211 |
| 4,162,862 A | | 7/1979 | Harker et al. .................. 404/72 |
| 4,231,518 A | * | 11/1980 | Zverev et al. .................. 239/81 |
| 4,236,950 A | | 12/1980 | Eigenmann ................... 156/71 |
| 4,489,022 A | | 12/1984 | Robyn et al. ................... 264/30 |
| 4,569,479 A | | 2/1986 | Suwa et al. |
| 4,765,773 A | | 8/1988 | Hopkins ....................... 404/94 |
| 4,792,468 A | | 12/1988 | Robyn et al. ................. 472/422 |
| 4,818,574 A | | 4/1989 | Mottet et al. ................. 427/422 |
| 4,946,806 A | | 8/1990 | Willard ........................ 501/88 |
| 4,981,628 A | | 1/1991 | Willard ........................ 264/30 |
| 4,988,647 A | | 1/1991 | Mottet et al. .................. 501/99 |
| 5,002,805 A | | 3/1991 | Robyn ......................... 427/309 |
| 5,013,499 A | | 5/1991 | Willard ........................ 264/30 |
| 5,202,090 A | | 4/1993 | Zvosec et al. ................ 266/281 |

(Continued)

FOREIGN PATENT DOCUMENTS

GB    2004263    3/1979

(Continued)

*Primary Examiner*—Yewebdar T Tadesse
(74) *Attorney, Agent, or Firm*—Weingarten, Schurgin, Gagnebin & Lebovici LLP

(57) ABSTRACT

A process, apparatus and material composition for forming a coherent refractory mass on a surface wherein one or more non-combustible materials are mixed with one or more metallic combustible powders and an oxidizer, igniting the mixture in a combustion chamber so that the combustible metallic particles react in an exothermic manner with the oxidizer and release sufficient heat to form a coherent mass of material under the action of the heat of combustion, and projecting this mass against the surface so that the mass adheres durably to the surface.

18 Claims, 2 Drawing Sheets

U.S. PATENT DOCUMENTS

| | | | |
|---|---|---|---|
| 5,203,923 A | 4/1993 | Hartman | 118/669 |
| 5,270,075 A | 12/1993 | Robyn | 427/201 |
| 5,285,967 A | 2/1994 | Weidman | 239/80 |
| 5,294,798 A | 3/1994 | Hartman | 250/458.1 |
| 5,296,256 A | 3/1994 | Hartman | 427/10 |
| 5,368,232 A | 11/1994 | Schroeder | 239/165 |
| 5,401,698 A | 3/1995 | Mottet | 501/105 |
| 5,472,737 A | 12/1995 | Anders | 427/137 |
| 5,486,269 A | 1/1996 | Nilsson | 162/31 |
| 5,529,432 A | 6/1996 | Huynh et al. | 404/84.05 |
| 5,529,433 A | 6/1996 | Huynh et al. | 404/94 |
| 5,665,793 A | 9/1997 | Anders | 523/172 |
| 5,686,028 A | 11/1997 | Meynckens et al. | 264/30 |
| 5,732,365 A | 3/1998 | Howard et al. | 588/10 |
| 5,738,830 A | 4/1998 | Stoltzfus et al. | 422/111 |
| 5,753,026 A | 5/1998 | Kuntz et al. | 106/450 |
| 5,780,114 A | 7/1998 | Meynckens et al. | 427/422 |
| 5,855,827 A | 1/1999 | Bussing et al. | |
| 5,866,049 A | 2/1999 | Meynckens et al. | 264/30 |
| 5,874,491 A | 2/1999 | Anders | 523/457 |
| 5,928,717 A | 7/1999 | Cherico et al. | 427/140 |
| 5,947,637 A | 9/1999 | Neuling | 404/94 |
| 5,951,201 A | 9/1999 | Jones | 404/94 |
| 5,970,993 A | 10/1999 | Witherspoon et al. | 134/1.1 |
| 6,001,426 A | 12/1999 | Witherspoon | 427/449 |
| 6,027,281 A | 2/2000 | Neuling | 404/75 |
| 6,149,341 A | 11/2000 | Neuling | 404/75 |
| 6,217,252 B1 | 4/2001 | Tolliver et al. | 404/77 |
| 6,284,045 B1 * | 9/2001 | Nakamura et al. | 118/306 |
| 6,337,106 B1 | 1/2002 | Brown | 427/341 |
| 6,372,288 B1 | 4/2002 | Meynckens et al. | 417/140 |
| 6,413,012 B1 | 7/2002 | Jones | 404/94 |
| 6,475,556 B1 | 11/2002 | Sobczak et al. | 427/137 |
| 6,517,010 B1 * | 2/2003 | Barykin et al. | 239/79 |
| 6,969,214 B2 | 11/2005 | Lichtblau | |
| 7,052,202 B2 | 5/2006 | Lichtblau | |
| 7,073,974 B2 | 7/2006 | Lichtblau | |
| 2002/0193256 A1 | 12/2002 | Harris, Jr. | 507/200 |
| 2003/0080203 A1 | 5/2003 | Roth et al. | 239/101 |
| 2003/0119655 A1 | 6/2003 | Meyer et al. | 501/127 |

FOREIGN PATENT DOCUMENTS

| | | |
|---|---|---|
| GB | 2144055 | 2/1985 |
| GB | 2213812 | 8/1989 |
| JP | 05201772 | 8/1993 |
| WO | WO 9523199 | 8/1995 |
| WO | WO 9616917 | 6/1996 |
| WO | WO 2005/004556 | 1/2005 |

* cited by examiner

FLAME SPRAYING PROCESS AND APPARATUS

CROSS REFERENCE TO RELATED APPLICATIONS

This application is related to U.S. patent application Ser. No. 10/774,199 filed Feb. 6, 2004, now abandoned, and U.S. patent application Ser. No. 10/863,651 filed Jun. 8, 2004, issued as U.S. Pat. No. 6,969,214, incorporated by reference herein.

STATEMENT REGARDING FEDERALLY SPONSORED RESEARCH OR DEVELOPMENT

N/A

BACKGROUND OF THE INVENTION

The "flame spray" or "thermal spray" process has been well documented and described in the prior literature. As described in U.S. Pat. No. 6,001,426: "Thermal spraying is a process of applying coatings of high performance materials, such as metal, alloys, ceramics and carbides, onto more easily worked and cheaper base materials. The purpose of the coating is to provide enhanced surface properties to the cheaper bulk material of which the part is made." As also stated in the same patent: "Thermal spray includes a variety of approaches, but can be grouped into three main coating processes: combustion, wire-arc, and plasma." Such thermal spray processes can be further subdivided into continuous and detonation processes.

All of these known thermal spraying processes have one thing in common: they all use an external energy source to provide the heat to soften or melt the material that is to be sprayed. In addition, the rate of deposition of these thermal spraying processes is relatively low and there is a need for higher spray rates.

The traditional flame spray processes use either a gas fuel (hydrogen) and oxygen mixture for the heat source or a high-powered electric arc. The hydrogen-oxygen heat source requires large high-pressure tanks of both gases, while the electric arc typically requires 55 Kilowatts of electric power (Sulzermetco F4 Gun Series).

One of the problems with the present thermal spraying process is the difficulty of controlling the chemical environment and preventing oxidation reactions which can occur on the surface of the powder particles prior to their impingement on the substrate.

It will be helpful to describe the present types of flame spray processes. These descriptions are available on the web site of the Gordon England Company in the UK, www.gordonengland.co.uk.

Combustion Powder Thermal Spray Process:

This process, also called the Low Velocity Oxygen Fuel Process (LVOF), is basically the spraying of molten material onto a surface to provide a coating. Material in powder form is melted in a flame (oxy-acetylene or hydrogen most common) to form a fine spray. When the spray contacts the prepared surface of the substrate material, the fine molten droplets rapidly solidity forming a coating.

The main advantage of this flame spray process over the similar Combustion wire spray process is that a much wider range of materials can be easily processed into powder form giving a larger choice of coatings. The flame spray process is only limited by materials with higher melting temperatures than the flame can provide or if the material decomposes on heating.

Combustion Wire Thermal Spray Process (Metal Spraying):

This flame spray process is basically the spraying of molten metal onto a surface to provide a coating. Material in wire form is melted in a flame (oxy-acetylene flame most common) and atomized using compressed air to form a fine spray. When the spray contacts the prepared surface of a substrate material, the fine molten droplets rapidly solidify forming a coating.

This flame spray process has been extensively used in the past and today for machine element work and anti-corrosion coatings.

Plasma Spray Process:

The Plasma Spray Process is basically the spraying of molten or heat softened material onto a surface to provide a coating. Material in the form of powder is injected into a very high temperature plasma flame, where it is rapidly heated and accelerated to a high velocity. The hot material impacts on the substrate surface and rapidly cools forming a coating.

The plasma spray gun comprises a copper anode and tungsten cathode, both of which are water cooled. Plasma gas (argon, nitrogen, hydrogen, helium) flows around the cathode and through the anode which is shaped as a constricting nozzle. The plasma is initiated by a high voltage discharge which causes localized ionization and a conductive path for a DC arc to form between the cathode and anode. The resistance heating from the arc causes the gas to reach extreme temperature, dissociate and ionize to form a plasma. The plasma exits the anode nozzle as a free or neutral plasma flame (plasma which does not carry electric current) which is quite different from the Plasma Transferred Arc coating process where the arc extends to the surface to be coated. Powder is fed into the plasma flame most commonly via an external powder port mounted near the anode nozzle exit.

Plasma spraying has the advantage over combustion processes in that plasma spraying can spray very high melting point materials such as refractory metals like tungsten and ceramics like zirconia. Plasma sprayed coatings are generally much denser, stronger and cleaner than other thermal spray processed with the exception of HVOF and detonation processes.

Disadvantages of the plasma spray process are its relatively high cost, complexity of the process, slow deposition rate and large amounts of electricity required.

Wire-Arc Spray Process:

In the Wire-Arc Spray Process a pair of electrically conductive wires are melted by means of an electric arc. The molten material is atomized by compressed air and propelled towards the substrate surface. This is one of the most efficient methods of producing thick coatings. "In the two-wire arc process, two insulated metallic wire electrodes are continuously fed to an arc point where a continuously flowing gas stream is used to atomize and spray the molten electrode material in the arc. Some configurations utilize a single feed wire and non-consumable electrode" (U.S. Pat. No. 6,001,426).

Electric arc spray coatings are normally denser and stronger than their equivalent combustion spray coatings. Low running costs, high spray rates and efficiency make it a good tool for spraying large areas and high production rates.

Disadvantages of the electric arc spray process are that only electrically conductive wires can be sprayed and if the substrate requires preheating, a separate heating source is needed.

High Velocity Oxygen Fuel (HVOF) Thermal Spray Process:

The HVOF thermal spray process is basically the same as the Combustion Powder Spray Process (LVOF) except that this process has been developed to produce extremely high spray velocity. There are a number of HVOF guns which use different methods to achieve high velocity spraying. One method is basically a high pressure water cooled HVOF combustion chamber and a long nozzle. Fuel (kerosene, acetylene, propylene and hydrogen) and oxygen are fed into the chamber the chamber, combustion produces a hot high pressure flame which is forced down a nozzle increasing in velocity. Powder may be fed axially into the HVOF combustion chamber under high pressure or fed through the size of a laval type nozzle where the pressure is lower.

The coatings produced by HVOF are similar to those produced by the detonation process. HVOF coatings are very dense, strong and show low residual tensile stress or in some cases compressive stress, which enable very much thicker coating to be applied than previously possible with other processes.

Detonation Thermal Spraying Process:

The Detonation gun basically consists of a long water cooled barrel with inlet valves for gases and powder. Oxygen and fuel (acetylene most common) is fed into the barrel along with a charge of powder. A spark is used to ignite the gas mixture and the resulting detonation heats and accelerates the powder to supersonic velocity down the barrel. A pulse of nitrogen is used to purge the barrel after each detonation. This process is repeated many times per second. The high kinetic energy of the not powder particles on impact with the substrate result in a build up of a very dense and strong coating.

For reference a copy of Table 3 from U.S. Pat. No. 6,001,426 is presented which compares existing thermal spray technologies.

TABLE 3

Comparison of thermal spray technologies.

Flame powder: Powder feedstock, aspirated into the oxygen/fuel-gas flame, is melted and carried by the flame onto the workpiece. Particle velocity is relatively low, and bond strength of deposits is low. Porosity is high and cohesive strength is low. Spray rates are usually in the 0.5 to 9 kg/h (1 to 20 lb/h) range. Surface temperatures can run quite high.
Flame wire: In flame wire spraying, the only function of the flame is to melt the material. A stream of air then disintegrates the molten material and propels it onto the workpiece. Spray rates for materials such as stainless steel are in the range of 0.5 to 9 kg/h (1 to 20 lb/h). Substrate temperatures are from 95 to 205° C. (200 to 400° F.) because of the excess energy input required for flame melting.
Wire arc: Two consumable wire electrodes are fed into the gun, where they meet and form an arc in an atomizing air stream. The air flowing across the arc/wire zone strips off the molten metal, forming a high-velocity spray stream. The process is energy efficient: all input energy is used to melt the metal. Spray rate is about 2.3 kg/h/kW (5 lb/h/kW). Substrate temperature can be low because energy input per pound of metal is only about one-eighth that of other spray methods.
Conventional plasma: Conventional plasma spraying provides free-plasma temperatures in the powder heating region of 5500° C. (10,000° F.) with argon plasma, and 4400° C. (8000° F.) with nitrogen plasma - above the melting point of any known material. To generate the plasma, an inert gas is superheated by passing it through a dc arc. Powder feedstock is introduced and is carried to the workpiece by the plasma stream. Provisions for cooling or regulation of the spray rate may be required to maintain substrate temperatures in the 95 to 205° C. (200 to 400° F.) range. Typical spray rate is 0.1 kg/h/kW (0.2 lb/h/kW).
Detonation gun: Suspended powder is fed into a 1 m (3 ft) long tube along with oxygen and fuel gas. A spark ignites the mixture and TABLE 3-continued Comparison of thermal spray technologies.

produces a controlled explosion. The high temperatures and pressures (1 MPa, 150 psi) that are generated blast the particles out of the end of the tube toward the substrate.
High-Velocity OxyFuel: In HVOF spraying, a fuel gas and oxygen are used to create a combustion flame at 2500 to 3100° C. (4500 to 5600° F.). The combustion takes place at very high chamber pressure (150 psi), exiting through a small-diameter barrel to produce a supersonic gas stream and very high particle velocities. The process results in extremely dense, well-bonded coatings, making it attractive for many corrosion-resistant applications. Either powder or wire feedstock can be sprayed, at typical rates of 2.3 to 14 kg/h (5 to 30 lb/h).
High-energy plasma: The high-energy plasma process provides significantly higher gas enthalpies and temperatures especially in the powder heating region, due to a more stable, longer arc and higher power density in the anode nozzle. The added power (two to three times that of conventional plasma) and gas flow (twice as high) provide larger, higher temperature powder injection region and reduced air entrainment. All this leads to improved powder melting, few unmelts, and high particle impact velocity.
Vacuum plasma: Vacuum plasma uses a conventional plasma torch in a chamber at pressures in the range of 10 to 15 kPa (0.1 to 0.5 atm). At low pressures the plasma is larger in diameter, longer, and has a higher velocity. The absence of oxygen and the ability to operate with higher substrate temperatures produces denser, more adherent coatings having much lower oxide contents.

BRIEF SUMMARY OF THE INVENTION

A process, apparatus and material composition for forming a coherent refractory mass on a surface wherein one or more non-combustible materials are mixed with one or more metallic combustible powders and an oxidizer, igniting the mixture in a combustion chamber so that the combustible metallic particles react in an exothermic manner with the oxidizer and release sufficient heat to form a coherent mass of the material under the action of the heat of combustion, and projecting this mass against the surface so that the mass adheres durably to the surface.

BRIEF DESCRIPTION OF THE SEVERAL VIEWS OF THE DRAWINGS

The invention will be further described in the following detailed description taken in conjunction with the accompanying drawings in which.

DETAILED DESCRIPTION OF THE INVENTION

Figure 1:
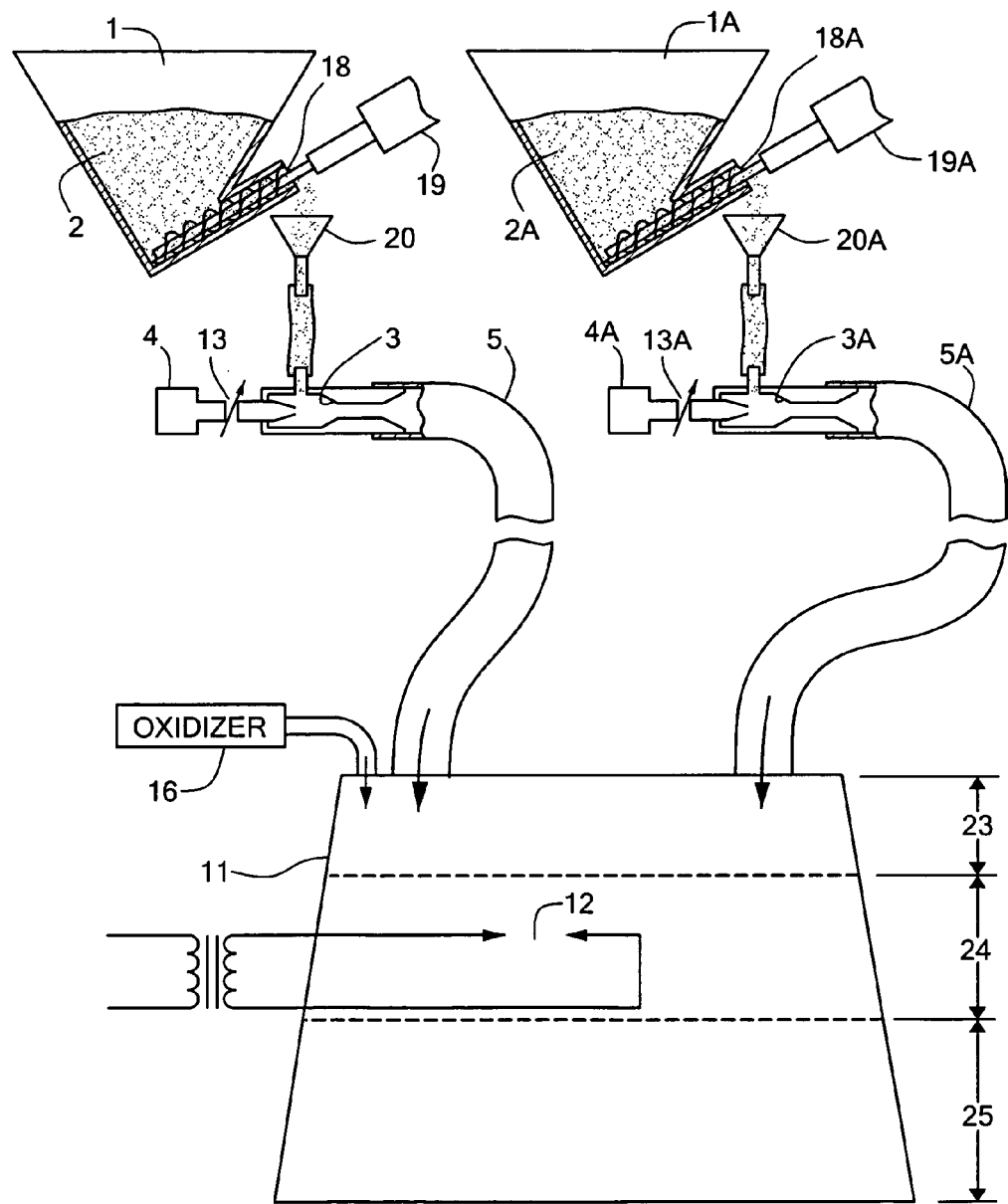
FIG. 1 is a diagrammatic representation of apparatus in accordance with one aspect of the invention.

The present patent is very similar to co-pending patent application Ser. No. 10/774,199 by the same applicant as herein. However, the co-pending patent application is primarily directed to the process of "painting" lines on highways whereas the present application is more generally applicable to flame spraying high temperature ceramic materials onto any surface without the use of external sources of energy.

The typical non-combustible materials used in the present application are powdered metal oxides such as titanium dioxide, aluminum oxide, silicon dioxide, chromium oxide, magnesium oxide, iron oxide, zirconium oxide, zinc oxide or a mixture of two or more thereof. All of these materials have melting temperatures above the typical oxygen fuel flame temperature and all of them are non-electrically conducting.

The source of heat is a powdered metallic fuel which is mixed with the powdered non-combustible materials that are to be flame sprayed. The non-combustible materials, metallic fuel and oxygen are mixed in a combustion chamber, ignited, and propelled from the end of the combustion chamber to impinge on the surface to be coated. The heat of combustion is sufficient to melt or soften the non-combustible materials and cause them to adhere to the surface to be coated.

Typically the powdered metallic fuel is mixed with the powdered non-combustible materials before entering the combustion chamber. However, in some cases it may be beneficial to mix the powdered fuel with the non-combustible material only after the materials have entered the combustion chamber.

The typical metallic fuel is selected from a group consisting of aluminum, silicon, zinc, magnesium, zirconium, iron and chromium or a mixture or two or more thereof. The flame temperature of these fuels are sufficiently high so that even Tungsten (melting point of 3695 Degrees Kelvin) could be flame sprayed with the technique shown in this patent.

The temperature can be controlled by the mixture and type of powdered fuel and the fuel/oxygen/air ratio. For example, to flame spray aluminum, chromium, or titanium oxides, the fuel would be aluminum powder which can generate a flame temperature in excess of 4,000° C. (7200° F.) which is sufficient to melt all of the oxides listed above.

If the objective is to flame spray silicon dioxide, then the fuel can be pure silicon powder along with air and/or a mixture of air and oxygen. The actual temperature can be controlled by varying the amount of excess air or the amount of silicon dioxide versus the silicon powder. The flame temperature of silicon can exceed 3100° C. (5600° F.).

For example, it is relatively easy to spray aluminum oxide or titanium dioxide directly onto steel in order to provide a long lasting, acid resistant, corrosion resistant, salt water resistant coating. This process can be performed in line with the actual iron or steel fabrication process or can be applied in the field. Since the source of energy to melt the ceramic materials is typically less than 10% of the weight of the ceramic materials, there is little weight and size penalty to perform the flame spraying process in the field.

The process can also be used to flame spray heat resistant refractory materials onto a roof to control the thermal properties of the roofing material. For example, aluminum and titanium oxides are almost perfectly white and reflect and scatter over 99% of the light (and heat) which impinges upon the surface.

On the other extreme, one form of iron oxide is black and can be flame sprayed onto a roof surface to enhance the energy absorption of the surface.

The process can be performed in situ where necessary and can always be performed in the factory where the roofing materials are prepared or a separate facility.

Another application is protecting the steel and iron pipes uses in the coal-tar gasoline extraction industry. In this case the pipes used to extract the tar are attacked by acid and have to be replaced frequently. By coating the surface of the pipes with silicon dioxide, the pipes would be protected from corrosion by the acid. The composition of the ceramic materials used to coat the pipes can be tailored to match the thermal expansion characteristics of the pipes.

Another application is to use melted silicon dioxide (glass) as a "glue" to bind a higher temperature refractory material to a surface. For example, silicon powder could be the fuel along with air as the oxygen source. The silicon would burn to produce silicon dioxide. The flame temperature can be controlled by the addition of excess air so that the flame temperature is sufficient to melt additional silicon dioxide but not some other ceramic material contained in the powder composition. The silicon dioxide would act as "glue" to bind the other ceramic materials onto the surface.

The present invention addresses the problem experienced by conventional thermal spraying processes in which oxidation reactions occur on the surface of powder particles prior to impact on the surface being coated, by limiting the chemicals which will be "thermally sprayed" to those which are already in oxide form; such as titanium dioxide and silicon dioxide.

The process, equipment and chemicals described in the above-noted copending patent application of the same applicant as the present invention uses a chemical burning process to flame spray refractory material into a road or other surface that can withstand the temperature involved. This type of flame spraying process can deposit anywhere from 10 Kg to 500 Kg per hour onto a surface as compared to the traditional flame spray process, which can typically only deposit up to 12 Kg per hour.

Apparatus according to one aspect of the invention is shown diagrammatically in FIG. 1. Metallic combustible powder is contained in a hopper or other container 1. Non-combustible oxide powder is contained in a hopper or other container 1A. These materials are conveyed such as by screw conveyers 18 and 18A (or other suitable conveying mechanism) to an aspirating device 3 and 3A where a gas carrier (typically air, oxygen or a mixture of the two) supplied by source 4 carries via supply lines 5 and 5A the powder to the mixing chamber 23, which also receives an oxidizer from an oxidizer source 16. The gas carrier can be adjusted by a control valve 13 and 13A. The mixed components are conveyed to a combustion chamber 24 which has a igniter 12 associated therewith to ignite the mixture provided to the combustion chamber. The combustion chamber has an outlet 25 from which emanates the flame spray for propulsion onto the surface being coated. The oxidizer is typically air, pure oxygen or a mixture of the two. In the embodiment of FIG. 1 the combustible powder and the non-combustible powders are supplied to the mixer via respective supply lines.

Figure 2:
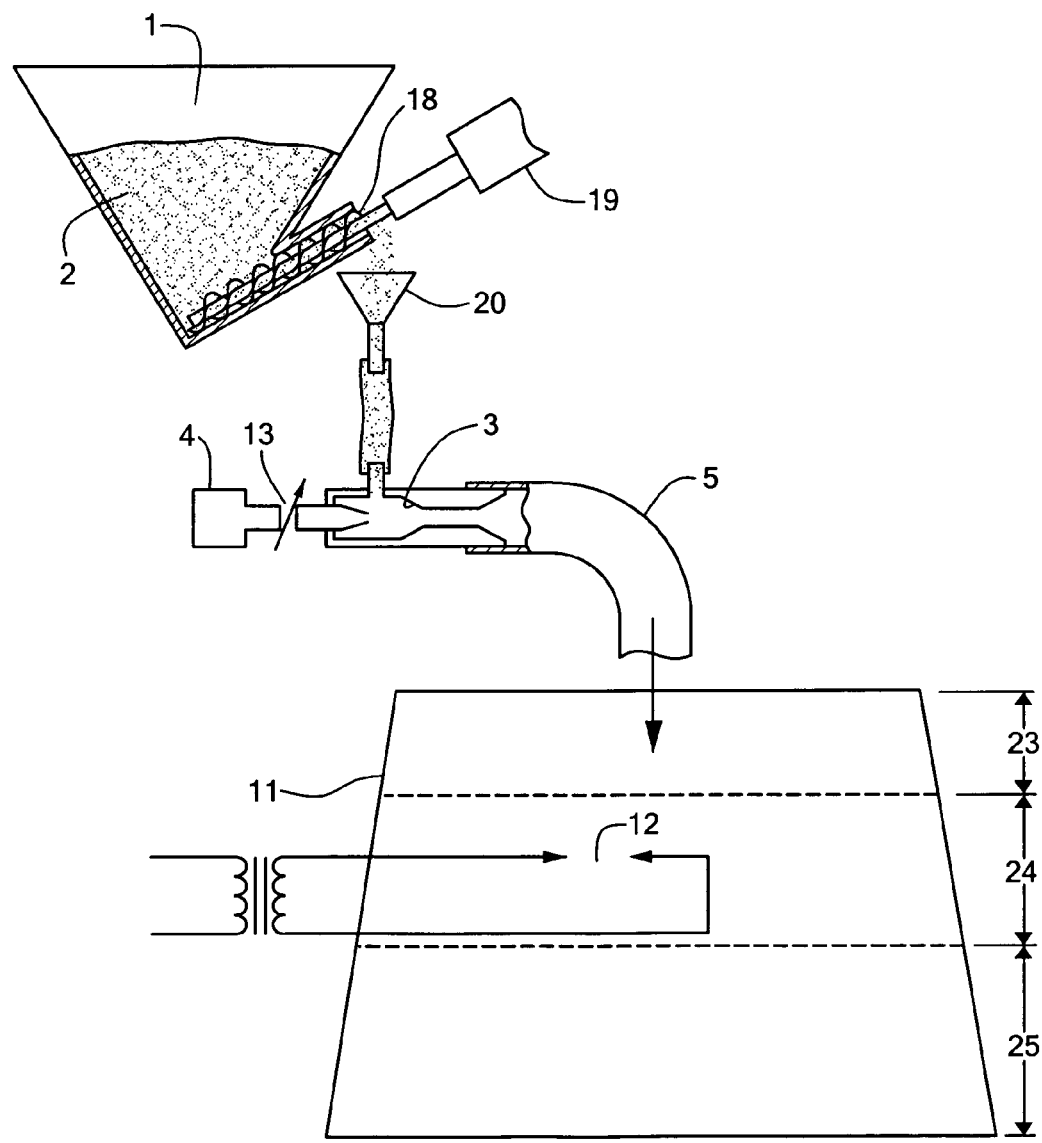
FIG. 2 is a diagrammatic representation of apparatus in accordance with a second aspect of the invention.

FIG. 2 is an alternative embodiment, wherein the combustible and non-combustible powders can be supplied from a single container 1 and provided by a single supply line 5 to the mixer. The oxidizer, supplied by source 4, can simultaneously act as the carrier and the oxidizer and be supplied along the same supply line as the combustible and non-combustible powders.

In FIGS. 1 and 2 the conveyer is driven by a variable speed motor 19 or 19A to provide the intended volume of material to the combustion chamber or mixer.

The combustion chamber can have a nozzle outlet for projecting the refractory mass onto the surface being coated. The combustion chamber may have, for particular applications, an outlet sized and shaped to accommodate the particular work surface being coated.

The invention is not to be limited by what has been particularly shown and described and is to embrace the full spirit and scope of the appended claims.

What is claimed is:

1. Apparatus for forming a coherent refractory mass on a surface, the apparatus comprising:

a combustion chamber having an outlet adjacent to a surface to be coated;

a single supply line for transporting one or more metallic combustible powders, one or more non-combustible materials and air, oxygen or a combination of the two to the combustion chamber;

a mixing chamber disposed downstream of the supply line and upstream of the combustion chamber for combining the one or more metallic combustible powders, one or more non-combustible materials and air, oxygen or a combination of the two in a mixture; and an igniter disposed in the combustion chamber and operative to ignite the combustible powder and oxidizer in the mixture in the combustion chamber to cause the metallic combustible powder in the mixture to react in an exothermic manner with the oxidizer in the combustion chamber, and release sufficient heat to form a refractory mass of melted or softened non-combustible materials, which is projected from the combustion chamber and against the surface to be coated so that the mass adheres durably to the surface.

2. The apparatus of claim 1 wherein the igniter is an electric arc.

3. The apparatus of claim 1 wherein the igniter is a gas pilot light.

4. The apparatus of claim 1 wherein the igniter is a plasma arc.

5. The apparatus of claim 1 wherein the rate of delivery of the combustible and non-combustible powder(s) is controlled by a screw conveyor driven by a variable speed motor and a variable valve which controls the rate of delivery of air, oxygen or a combination of the two.

6. The apparatus of claim 1 wherein the rate of deposition of the coherent mass onto the surface to be coated is. controlled by the rate of movement between the surface to be coated and the exit of the combustion chamber or vice-versa.

7. The apparatus of claim 1 wherein the combustion chamber is made of a ceramic material.

8. The apparatus of claim 1 wherein the combustion chamber is made of metal that is coated on the inside with a high temperature ceramic coating.

9. Apparatus for forming a coherent refractory mass on a surface, the apparatus comprising:

a combustion chamber having an outlet adjacent to a surface to be coated;

a single supply line for transporting one or more metallic combustible powders, one or more non-combustible materials and air, oxygen or a combination of the two to the combustion chamber;

a mixing chamber disposed downstream of the supply line and upstream of the combustion chamber for combining the one or more metallic combustible powders, one or more non-combustible materials and air, oxygen or a combination of the two in a mixture; and an electric arc igniter disposed in the combustion chamber and operative to ignite the combustible powder and oxidizer within the mixture in the combustion chamber to cause the metallic combustible powder in the combustion chamber to react in an exothermic manner with the oxidizer, and release sufficient heat to form a refractory mass of melted or softened non-combustible materials, which is projected from the combustion chamber and against the surface to be coated so that the mass adheres durably to the surface.

10. The apparatus of claim 9 wherein the rate of delivery of the combustible and non-combustible powder(s) is controlled by a screw conveyor driven by a variable speed motor and a variable valve which controls the rate of delivery of air, oxygen or a combination of the two.

11. The apparatus of claim 9 wherein the rate of deposition of the coherent mass onto the surface to be coated is controlled by the rate of movement between the surface to be coated and the exit of the combustion chamber or vice-versa.

12. The apparatus of claim 9 wherein the combustion chamber is made of a ceramic material.

13. The apparatus of claim 9 wherein the combustion chamber is made of metal that is coated on the inside with a high temperature ceramic coating.

14. Apparatus for forming a coherent refractory mass on a surface, the apparatus comprising:

a combustion chamber having an outlet adjacent to a surface to be coated;

a single supply line for transporting one or more metallic combustible powders, one or more non-combustible materials and air, oxygen or a combination of the two to the combustion chamber;

a mixing chamber disposed downstream of the supply line and upstream of the combustion chamber for combining the one or more metallic combustible powders, one or more non-combustible materials and air, oxygen or a combination of the two in a mixture; and a plasma arc igniter disposed in the combustion chamber and operative to ignite the combustible powder and oxidizer in the combustion chamber to cause the metallic combustible powder in the mixture to react in an exothermic manner with the oxidizer, and release sufficient heat to form a refractory mass of melted or softened non-combustible materials, which is projected from the combustion chamber and against the surface to be coated so that the mass adheres durably to the surface.

15. The apparatus of claim 14 wherein the rate of delivery of the combustible and non-combustible powder (s) is controlled by a screw conveyor driven by a variable speed motor and a variable valve which controls the rate of delivery of air, oxygen or a combination of the two.

16. The apparatus of claim 14 wherein the. rate of deposition of the coherent mass onto the surface to be coated is controlled by the rate of movement between the surface to be coated and the exit of the combustion chamber or vice-versa.

17. The apparatus of claim 14 wherein the combustion chamber is made of a ceramic material.

18. The apparatus of claim 14 wherein the combustion chamber is made of metal that is coated on the inside with a high temperature ceramic coating.

* * * * *

UNITED STATES PATENT AND TRADEMARK OFFICE
CERTIFICATE OF CORRECTION

| | | |
|---|---|---|
| PATENT NO. | : 7,449,068 B2 | Page 1 of 1 |
| APPLICATION NO. | : 10/948420 | |
| DATED | : November 11, 2008 | |
| INVENTOR(S) | : George Jay Lichtblau | |

It is certified that error appears in the above-identified patent and that said Letters Patent is hereby corrected as shown below:

Column 3, lines 9-10, "the chamber the chamber" should read --the chamber--.

Signed and Sealed this

Twenty-eighth Day of July, 2009

JOHN DOLL
*Acting Director of the United States Patent and Trademark Office*